(12) United States Patent
Callis

(10) Patent No.: US 7,510,390 B2
(45) Date of Patent: Mar. 31, 2009

(54) MACHINABLE COMPOSITE MOLD

(75) Inventor: Richard A. Callis, Covington, WA (US)

(73) Assignee: Hexcel Corporation, Dublin, CA (US)

( * ) Notice: Subject to any disclaimer, the term of this patent is extended or adjusted under 35 U.S.C. 154(b) by 721 days.

(21) Appl. No.: 11/180,831

(22) Filed: Jul. 13, 2005

(65) Prior Publication Data

US 2007/0012858 A1   Jan. 18, 2007

(51) Int. Cl.
   *B29C 33/40* (2006.01)
(52) U.S. Cl. .................... 425/470; 239/134; 264/338
(58) Field of Classification Search ............ 425/470; 239/134; 264/338
   See application file for complete search history.

(56) References Cited

U.S. PATENT DOCUMENTS

| | | | | |
|---|---|---|---|---|
| 4,851,280 A | * | 7/1989 | Gupta ..................... | 442/292 |
| 5,362,226 A | * | 11/1994 | Kataoka et al. ............ | 425/526 |
| 6,777,086 B2 | * | 8/2004 | Norley et al. .............. | 428/408 |
| 6,841,021 B1 | * | 1/2005 | Mesing et al. ............. | 156/212 |
| 6,849,098 B1 | * | 2/2005 | Joseph et al. .............. | 44/620 |

FOREIGN PATENT DOCUMENTS

| | | | |
|---|---|---|---|
| EP | 0415436 | * | 6/1991 |
| EP | 0642904 A1 | | 9/1994 |
| EP | 1134314 A1 | * | 9/2001 |
| EP | 1134314 B1 | | 9/2004 |
| WO | WO 2004/030897 | | 4/2004 |
| WO | WO 2004/030906 | | 4/2004 |
| WO | WO 2004030897 A1 | * | 4/2004 |
| WO | WO 2004030906 A1 | * | 4/2004 |

OTHER PUBLICATIONS

Krey et al., Avimid® N: High Temperature Composite Tooling, Sprechsaal vol. 123, No. 4, 1990, pp. 403-408.
Valencia, Bismaleimide Tooling Prepreg for 450 Degrees F Application DuraTool 450, SME Fabricating Composites Conference, Sep. 1988, pp. 181-193.
CYTEC brochure—DURATOOL®450 Tooling Prepreg, Jan. 1998, pp. 1-14.
Advance Composite Group brochure—ACG HTM512-BMI Tooling Prepreg—1997, pp. 1-6.

* cited by examiner

*Primary Examiner*—Kimberly Stewart
(74) *Attorney, Agent, or Firm*—W. Mark Bielawski; David J. Oldenkamp

(57) ABSTRACT

Machinable composite molds for use in making a composite structure. The mold includes a mold body having a tool surface that is shaped to provide the molded surface of the composite structure. The mold body is made up of at least one mold layer composed of a quasi-isotropic material composed of a plurality of randomly oriented fiber bundles or chips impregnated with a resin. The use of randomly oriented fiber chips allows post-cure machining of the mold body.

20 Claims, 3 Drawing Sheets

MACHINABLE COMPOSITE MOLD

BACKGROUND OF THE INVENTION

1. Field of the Invention

The present invention relates generally to apparatus and methods used to mold composite materials to form composite structures. More particularly, the present invention is directed to the molds/tools that are used to form such composite structures.

2. Description of Related Art

Many processes for making composite structures utilize a mold or tool to provide desired surface contours and shapes. The mold is particularly important in autoclave processes where the uncured resin/fiber material is heated in the mold, under vacuum, to relatively high cure temperatures (350° F. and above) to form the final composite part or structure.

Molds made from steel alloys, such as INVAR36, are being presently used because they are extremely strong and can easily withstand the elevated cure temperatures used in autoclaves for composite material curing. These molds are also commonly referred to as "tools" or "tooling". Steel alloy molds can be machined to obtain tight surface profile tolerances. In addition, steel alloy molds can be modified to provide different surface configuration and/or reconditioned by simply machining and polishing the mold surface. A further advantage is that steel alloy molds can be reused many times (in excess of 500 cycles) before they need to be reconditioned. Although steel alloy molds are well suited for their intended purpose, there are a number of drawbacks associated with the use of steel alloy molds. For example, steel alloy molds tend to be heavy and expensive. In addition, the time required to heat and then cool a massive steel alloy mold increases the cycle time during molding of composite structures.

Molds made from composite materials have been developed as an alternative to steel alloy molds. Composite molds have been popular because they are typically lighter and less expensive to make than steel alloy molds. The composite molds are generally formed using a highly accurate master mold that is made from a steel alloy or other suitable material. Examples of prior composite molds are set forth in U.S. Pat. No. 4,851,280.

Bismaleimide and polyimide resins have been used widely in combination with carbon fibers as the materials of choice for composite molds. Woven carbon fabric that has been hand cut into square pieces is applied to the master mold to form multiple individual layers. The pieces of woven fabric are oriented in the master mold to provide smooth tooling surfaces. Resin can be introduced into the woven fiber pieces in a number of ways. For example, the resin can be added through automated impregnation by the material manufacturer (prepreg). Alternatively, the resin can be introduced into the woven pieces when they are in the master mold. This is accomplished by vacuum infusion or simple hand application of the resin.

In general, a lower aerial weight woven fabric is used as the surface ply and/or surface resin gel coat for the composite mold in order to obtain a pit-free surface. Aerial weights for the surface fabric are usually on the order of 250 grams per square meter (gsm). The use of the low aerial weight woven fabric at the mold surfaces also tends to minimize the transfer or telegraphing of the relatively rough texture of underlying higher aerial weight woven fabrics (around 650 gsm) to the mold surface. The higher aerial weight fabrics are typically used in the body of the mold to build up the laminate bulk/thickness that is needed to achieve desired mold strength.

A problem with composite molds is that they are difficult to machine or repair. In addition, it is difficult to process the mold to obtain tight surface tolerances or accommodate changes in the profile of the mold surface without degradation of vacuum integrity and compromising dimensional stability. This problem arises because machining the surface of the mold exposes the heavier weight woven material and changes the quasi-isotropic characteristics of the laminate. The removal of layers of different weight material also leaves an unbalanced laminate that can distort and affect the dimensional integrity of the mold and compromise vacuum integrity. In addition, the heavier weight materials tend to be porous due to the woven characteristics of the material. When machining into these layers, the porosity affects vacuum integrity and vacuum leaks can develop along the interlaminar shear planes that are formed due to the material being applied to the master mold as layers. Machining of composite molds is further complicated because the resins used in composite molds tend to be brittle.

SUMMMARY OF THE INVENTION

In accordance with the present invention, molds (also referred to as "tooling") are provided for use in making composite structures wherein the mold body is made from a quasi-isotropic material that is composed of a plurality of randomly oriented fiber bundles impregnated with a resin. It was discovered that the use of randomly oriented fiber bundles or chips, which are impregnated with an appropriate resin, provides a composite mold that can be machined to the same surface tolerances as metal molds.

Molds in accordance with the present invention are intended for use in making a composite structure or part that has a molded surface. The composite mold includes a mold body having a tool surface that is shaped to provide a desired molded surface for the composite structure. The mold body is made from at least one mold layer that is composed of a quasi-isotropic material that is made up of a plurality of randomly oriented fiber bundles or chips that are impregnated with a resin. The mold layer includes a surface that forms at least a part of the tool surface.

As one aspect of the present invention, the mold body includes at least two mold layers wherein both of the mold layers have a surface that forms at least a part of the tool surface. The tool surfaces on the two or more mold layers are formed using a master mold and then they are further shaped, if desired, by machining.

The present invention covers methods for molding composite structures using the composite molds as described above. In addition, the present invention covers methods for modifying the composite molds. These methods involve modifying the pre-existing molds by machining the mold and/or by bonding at least one additional mold layer to the tool surface. The additional layer is then machined, if desired, to form a modified tool surface. This type of mold modification method is useful in changing the surface configuration of the mold or repairing a damaged tool surface.

The above discussed and many other features and attendant advantages of the present invention will become better understood by reference to the detailed description when taken in conjunction with the accompanying drawings.

DETAILED DESCRIPTION OF THE INVENTION

Figure 1:
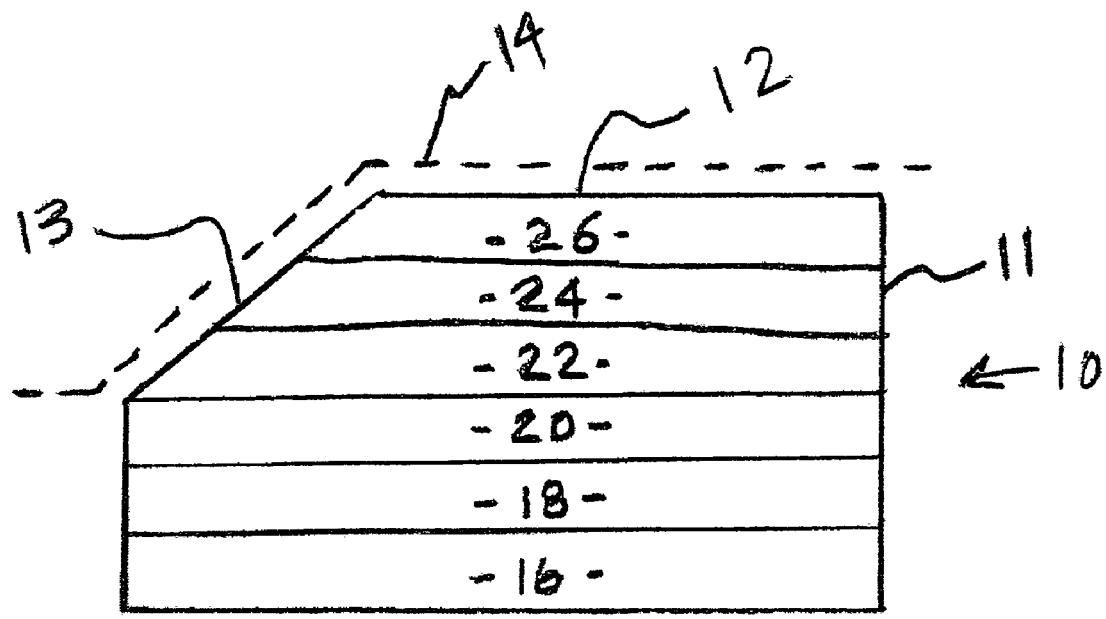
FIG. 1 is a diagrammatic representation of a portion of a mold in accordance with the present invention where six mold layers are used to form the mold body.

A portion of an exemplary composite mold in accordance with the present invention is shown diagrammatically at 10 in FIG. 1. The mold is intended for use in fabricating composite parts in accordance with known autoclave curing processes where service temperatures are typically between 350° F. and 500° F. However, if desired, the mold may be used in other molding processes where it is not necessary to heat the material being molded. The mold 10 is designed as a replacement for existing composite molds or tooling that are typically supported by another structure during the molding process. These types of composite molds have been in use for many years to mold a wide variety of composite materials. The molds of the present invention may be used in any situation where such a composite mold is required.

The mold 10 includes a mold body 11 that has tool surfaces 12 and 13 that are shaped to provide the desired molded surface on the composite structure that is being fabricated. The tool surfaces 12 and 13 are shaped using a master mold (shown in phantom at 14) in accordance with well-known procedures for making composite molds. The mold body 11 is shown having six mold layers 16, 18, 20, 22, 24 and 26. The mold layers are formed in accordance with conventional lay up procedures where each uncured layer is sequentially applied to the master mold 14 beginning with mold layer 26 and ending with mold layer 16. After the desired numbers of layers are applied, the resulting body is cured to form the mold body 11. The tool surface 12 is formed by a single mold layer 26. This is to be contrasted with tool surface 13 that is formed by mold layers 26, 24 and 22.

It is preferred, but not necessary, that each of the mold layers used in the mold body be made from quasi-isotropic material that is composed of randomly oriented fiber bundles or chips that are impregnated with a suitable resin. It is only necessary that the mold layers that form the tool surfaces (either by initial molding or subsequent machining) be made from semi-isotropic material. The term "quasi-isotropic material", as used herein, also covers those composite materials referred to as "transversely-isotropic". These materials are made up of randomly oriented chips or bundles, which are composed of fibers that are impregnated with a suitable resin. Exemplary quasi-isotropic materials are described in European Patent No. EP 1,134,314 B1.

The quasi-isotropic materials that may be used to make composite molds in accordance with the present invention include randomly oriented chip or bundles of carbon fiber impregnated with a suitable resin. Other types of fibers, such as glass fibers, ceramic fibers and hybrids may be used, if desired. The fibers are grouped together to form a rectangular chip or bundle. The chips should be from ½ to 4 inches long and from ⅛ to 1 inch wide. The fibers in each chip may be unidirectional or woven. Chips with unidirectional fibers are preferred. Each of the chips should contain from 1,000 to 100,000 fibers. The chips may contain differing amounts of resin and fibers. It is preferred that the resin content be from 30 to 50 volume percent with 36 to 40 volume percent being particularly preferred resin.

The quasi-isotropic material is preferably provided as a sheet or layer of chips that forms an uncured prepreg that is from 0.04 to 0.5 inch thick. The preferred thickness of the layer of chips is from 0.06 to 0.10 inch. The areal weight of the individual chips is typically between about 200 to 300 gsm, which correlates to prepreg layers having areal weights of about 1000 to 3500 gsm. Exemplary resins that can be used to form the quasi-isotropic material include bismaleimide, polyimide, PEEK, phenolic and the like. Preferred quasi-isotropic materials are a prepreg layer composed of chips made up of carbon fibers impregnated with a bismaleimide resin.

Preferred quasi-isotropic materials are available from Hexcel Corporation (Dublin, Calif.) under the tradename HexMC®. HexMC® is provided as an uncured prepreg in the form of sheets or layers that are laid up in the master mold and then cured according to standard procedures for bismaleimide resins. HexMC® is supplied as a prepreg material that must be heat cured once the material has been placed in the master mold. HexMC®/C/M61 is one type of material that is particularly preferred. This material is made from ⅓×2 inch chips of HexPLY® M65 unidirectional prepreg. Quasi-isotropic materials that have properties similar to HexMC® may be used, provided that they can be machined to the surface tolerances set forth below.

Figure 2:
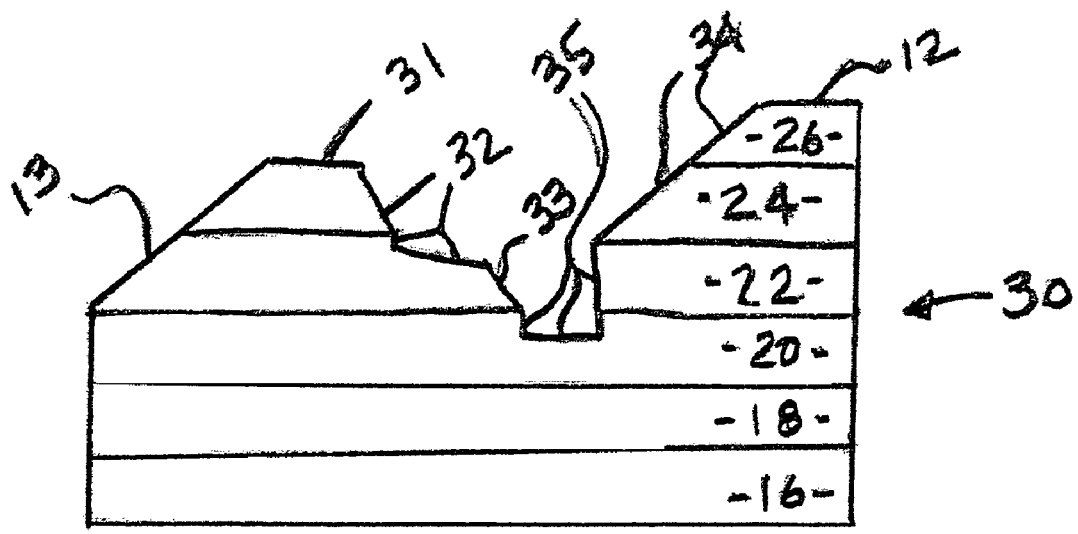
FIG. 2 is a diagrammatic representation of a portion of a mold in accordance with the present invention where the mold shown in FIG. 1 has been machined to form a different tool surface.

As a feature of the present invention, the mold body 11 can be machined, if desired, to obtain surface tolerances that are equivalent to metal molds. A machined mold is shown in FIG. 2 at 30. The machined mold 30 is the same as mold 10 except that the original tool surfaces 12 and 13 have been machined to provide additional tool surfaces 31, 32, 33, 34 and 35. The formation of these additional tool surfaces can be accomplished using any of the known machining tools and techniques that are commonly used in machining steel and/or composite material molds. Such machining tools typically employ carbide and diamond coated numerical controlled (N/C) cutters. A minimal amount of polishing of the tool surfaces 31, 32, 33, 34 and 35 may be required after initial machining to achieve desired surface tolerances. Typical surface tolerances on the order of ±0.01 inch or less can be achieved when the mold is made using the semi-isotropic material in accordance with the present invention. Preferably, the surface tolerances will be less than ±0.005 inch and even more preferably below ±0.003 inch.

As shown in FIG. 2, a wide variety of machined surfaces are possible. For example, machined tool surface 31 extends parallel to the mold layers so that only mold layer 24 is machined. Machined tool surface 32 shows a machined surface where material is removed from mold layers 22 and 24. Machined tool surface 33 is an example of a compound surface where material is removed from a single mold layer 22. Machined tool surface 34 shows a machined surface that extends completely through two mold layers 24 and 26. Machined tool surface 35 further shows the types of possible machined surfaces that are possible when the mold body is made from quasi-isotropic material in accordance with the present invention. It should be noted that in mold 30, mold layers 20, 22, 24 and 26 must be made from quasi-isotropic material since they are machined. Layers 18 and 16 are also preferably quasi-isotropic. However, these two layers (18 and 16) may be made from other compatible composite materials, if desired.

It should be noted that the machined tool surfaces are divided into five sections with different numbers in FIG. 2 for demonstrative purposes to show the various types of simple tool surfaces that can be machined into the various layers in the mold body 11. These five sections may also be viewed as a single complex tool surface that extends four mold layers deep into the mold body. The quasi-isotropic material used to form the mold bodies in accordance with the present invention allows one to make such complex machined tooling surfaces that extend through multiple mold layers and have surface tolerances on the order of those obtained with metal molds.

Figure 3:
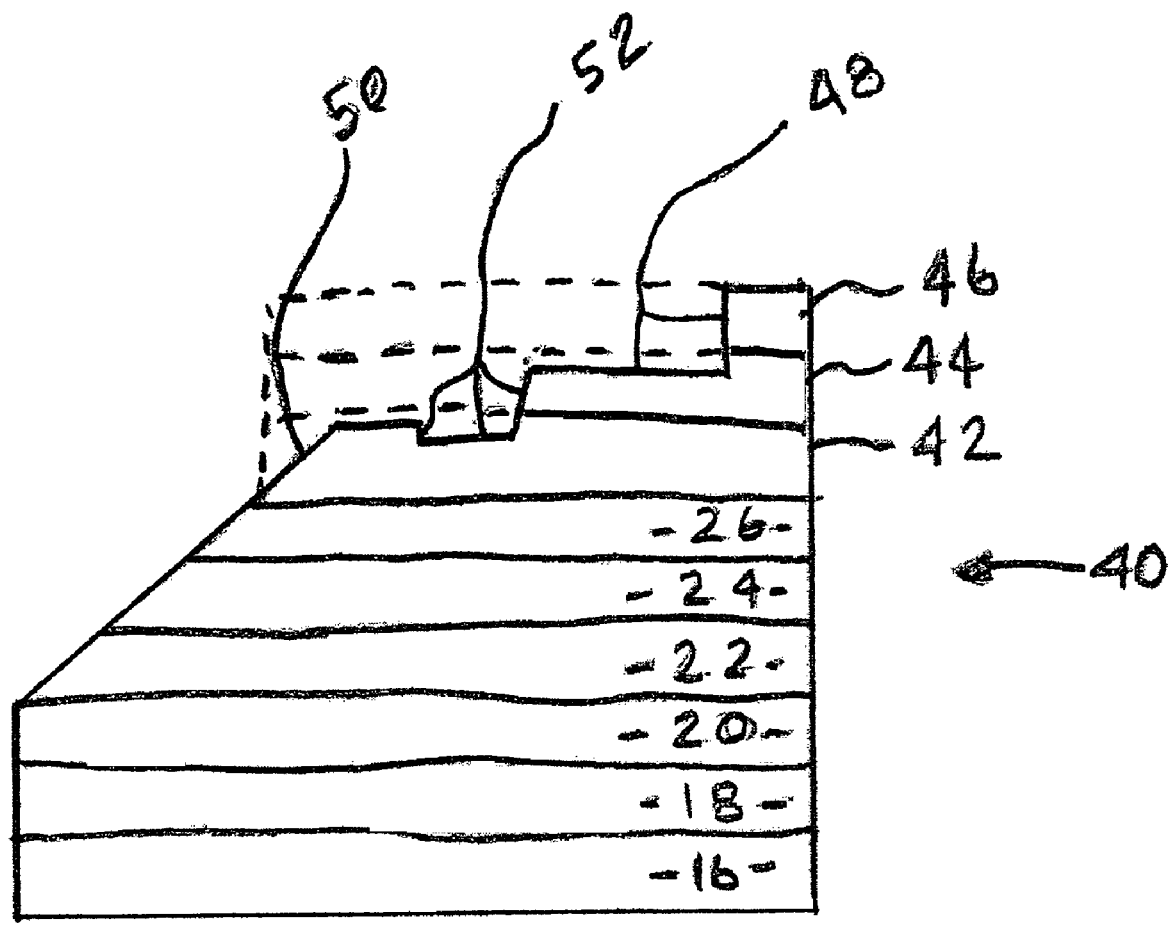
FIG. 3 is a diagrammatic representation of a portion of a mold in accordance with the present invention where the mold shown in FIG. 1 has been modified by adding three additional mold layers followed by machining of the three additional layers to provide a modified tool surface.

As another feature of the present invention, the mold body may be modified or reconditioned by adding additional mold layers to the surface of the mold body and then machining the added mold layers, if desired. An exemplary modified mold is shown at 40 in FIG. 3. The modified mold 40 is the same as mold 10 except that three additional mold layers 42, 44 and 46 have been added to the top of the mold body. The phantom lines in FIG. 3 show the shape of the additional mold layers prior to machining to form the modified tool surfaces 48, 50 and 52. The additional mold layers 42, 44 and 46 are preferably added to the underlying mold layer 26 as pre-impregnated quasi-isotropic material (prepreg). A bonding agent, if desired, may also be used. Bismaleimide adhesives are exemplary bonding agents.

A master mold may be used to shape the three additional mold layers without any subsequent machining. However, as shown in FIG. 3, it is also possible to machine the added mold layers to provide a modified or reconditioned tool surface. The quasi-isotropic materials used to modify the composite molds are preferably selected from the same quasi-isotropic materials that are used to make the underlying mold body. The procedures used for applying and curing the additional layers of quasi-isotropic material are the same as those used in formation of the original mold body.

Figure 4A:
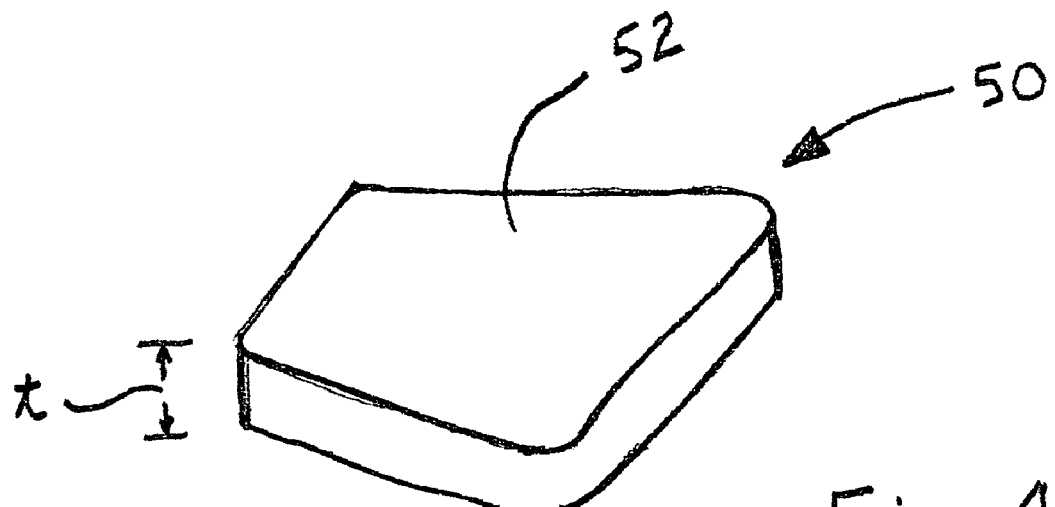
FIG. 4A is a partial view of an exemplary mold in accordance with the present invention prior to machining and FIG. 4B is the same mold after it has been machined.

Examples of practice are as follows:

A mold was prepared using 11 layers of HexMC®/C/M61 BMI/carbon quasi-isotropic prepreg material. The 11 layers were laid up by hand on an epoxy master mold with the use of hand pressure and a heat gun to insure that the material conformed to the mold. Once laid up, the 11 layers of HexMC® M61 were cured at 375° F. for 240 minutes in an autoclave at 100 psi to provide the cured mold body. An exemplary section of the mold is shown at 50 in FIG. 4A prior to any machining. The mold ranged in thickness (t) from 0.999 inch to 0.607 inch. The surface shown at 52 was the part of the mold 50 that was laid up against the master mold. The surface area of the section shown at 52 is about 10 square feet.

Figure 4B:
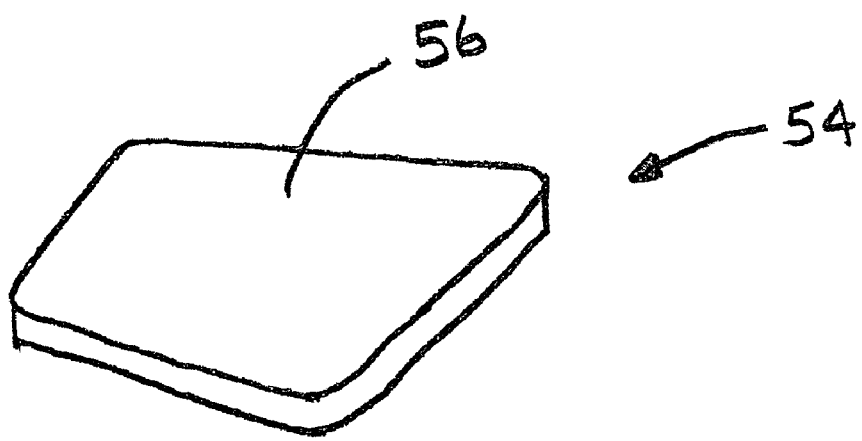

The mold surface 52 was machined using a standard Carbide PVD TiAlN Ball nose cutter at a rough cut depth of approximately ¼ inch using a spindle speed of 2,000 rpm and a feed rate of 60 inches per minute. The rough cut surface was then finish machined at a spindle speed of 3,000 rpm, cut depth of approximately 0.010 inch and a feed rate of 70 inches per minute to provide a finished mold 54 that has a finished mold or tool surface 56 (see FIG. 4B). In forming the finished mold 54, the mold surface 52 was rough cut and then machined to provide a uniform mold thickness that was approximately 0.10 inch less than the minimum thickness of the original mold 50. The resulting finished mold 54 had thicknesses that ranged from 0.496 inch to 0.518 inch. The contour deviation of the machined mold surface 56 was less than ±0.003 inch.

The finished mold 54 was subjected to 114 cure (molding) cycles in an autoclave at 60 psi/350° F. over a period of approximately 855 hours (approximately 7.5 hours per cycle) without any degradation in the surface profile, surface durability or vacuum integrity of the mold. The finished mold should provide up to 500 autoclave cycles at 400° F. (autoclave cycles of 10 hours or less) or 100 autoclave cycles at 450° F. (autoclave cycles of 10 hours or less).

In additional examples, molds having from 11 to 22 layers of HexMC®/C/M61 are laid up and cured as set forth above to provide void-free molds that are from 0.80 to 1.25 inch thick. These molds may be machined as described above to provide a wide variety of mold shapes that are suitable as an alternative to the steel alloy molds that are now being used to mold composite parts.

The molding cycles of between 7 to 10 hours for the finished mold 54 is less than the typical molding cycles for steel alloy molds, such as INVAR36. These reduced cycle times are achieved in accordance with the present invention, while still unexpectedly providing machining characteristics, surface profile tolerances and durability that typically have only been available in steel molds. In addition, the composite molds of the present invention are approximately 5 times lighter than similar steel alloy molds and easier to machine.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A mold for use in making a composite structure wherein said composite structure has a molded surface, said mold comprising:
   a mold body comprising a tool surface which is shaped to provide said molded surface of said composite structure, said mold body comprising at least one mold layer comprising a quasi-isotropic material comprising a plurality of randomly oriented rectangular chips comprising fibers and a resin, said mold layer comprising a surface that forms at least a part of said tool surface.

2. A mold for use in making a composite structure according to claim 1 wherein said resin comprises bismaleimide resin and said fibers comprise carbon fibers.

3. A mold for use in making a composite structure according to claim 1 wherein at least two mold layers are used to form said mold body.

4. A mold for use in making a composite structure according to claim 3 wherein said tool surface extends across at least a portion of two adjacent mold layers.

5. A mold for use in making a composite structure according to claim 1 wherein at least a portion of said tool surface is formed by machining at least a portion the surface of said mold layer.

6. A mold for use in making a composite structure according to claim 4 wherein at least a portion of said two adjacent mold layers are machined to provide said tool surface that extends across at least a portion of each of said adjacent mold layers.

7. A mold for use in making a composite structure according to claim 1 wherein said fibers comprise unidirectional fibers or woven fibers.

8. A mold for use in making a composite structure according to claim 2 wherein said fibers comprise unidirectional fibers or woven fibers.

9. A mold for use in making a composite structure according to claim 1 wherein said fibers comprise unidirectional fibers.

10. A mold for use in making a composite structure according to claim 2 wherein said fibers comprise unidirectional fibers.

11. A mold for use in making a composite structure according to claim 1 wherein said rectangular chips are from ½ inch to 4 inches long and from ⅛ inch to 1 inch wide.

12. A mold for use in making a composite structure according to claim 2 wherein said rectangular chips are from ½ inch to 4 inches long and from ⅛ inch to 1 inch wide.

13. A mold for use in making a composite structure according to claim 1 wherein said chip comprises from 1,000 to 100,000 fibers.

14. A mold for use in making a composite structure according to claim 2 wherein said chip comprises from 1,000 to 100,000 fibers.

15. A mold for use in making a composite structure according to claim 1 wherein said resin comprises from 30 to 50 volume percent of said chips.

16. A mold for use in making a composite structure according to claim 2 wherein said resin comprises from 30 to 50 volume percent of said chips.

17. A mold for use in making a composite structure according to claim 5 wherein said portion of said tool surface that is formed by machining has a surface contour deviation of less than ±0.003 inch.

18. A mold for use in making a composite structure according to claim 6 wherein said portion of said tool surface that is formed by machining has a surface contour deviation of less than ±0.003 inch.

19. A mold for use in making a composite structure according to claim 17 wherein said resin comprises bismaleimide resin and said fibers comprise carbon fibers.

20. A mold for use in making a composite structure according to claim 18 wherein said resin comprises bismaleimide resin and said fibers comprise carbon fibers.

* * * * *